, 1964

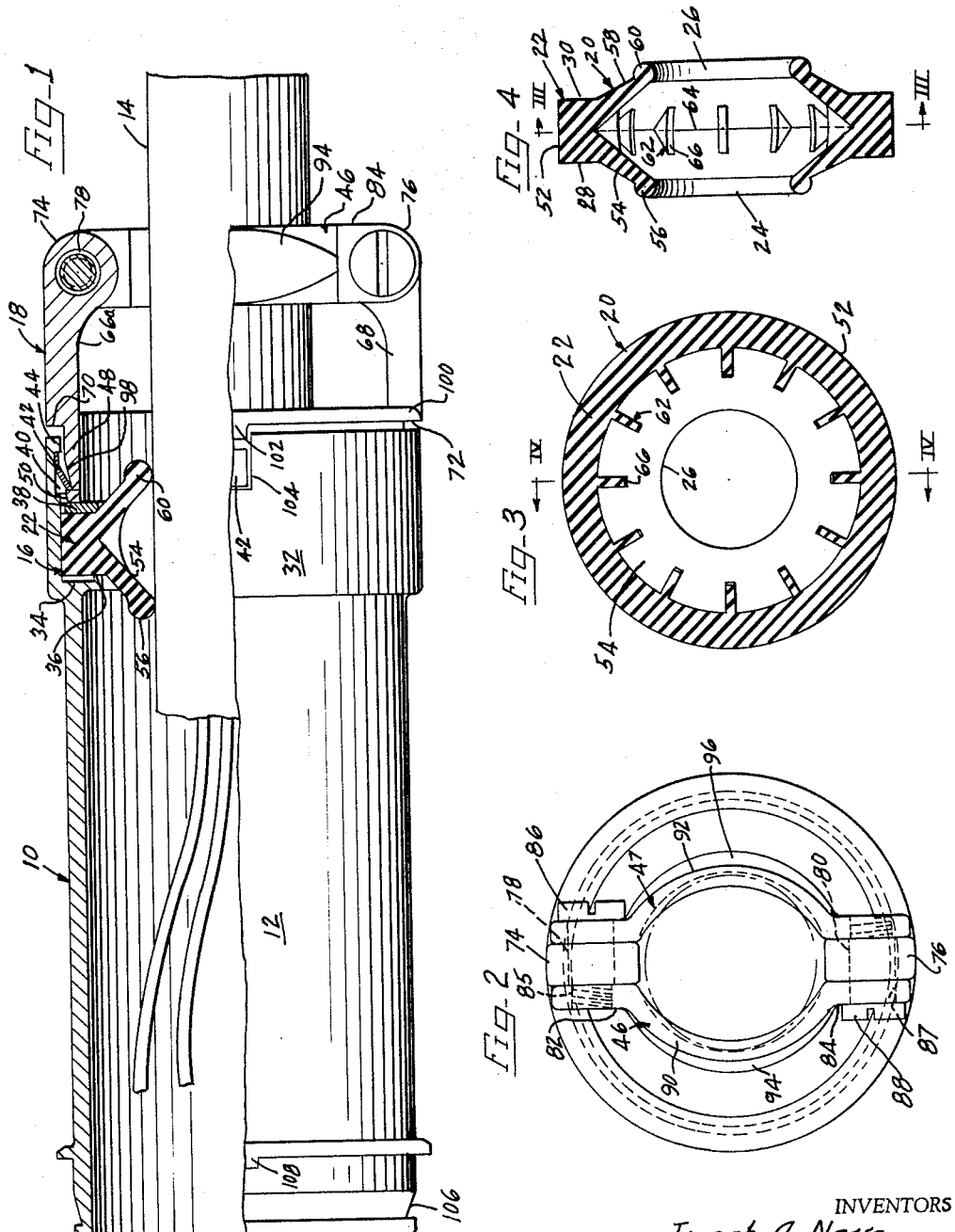

3,158,379
BUTTERFLY SEALING GLAND
Joseph A. Nava, Villa Park, Ill., and Robert Lee Hume, Parma Heights, Ohio, assignors to The Pyle-National Company, Chicago, Ill., a corporation of New Jersey
Filed Feb. 8, 1960, Ser. No. 7,467
2 Claims. (Cl. 277—206)

The present invention relates to a sealing gland and clamp assembly for electrical connectors, and more particularly to a gland which seals a cable where it enters an electrical connector or goes through a bulkhead and which coacts with clamping means for clamping the cable without interference with the sealing action of the gland.

Heretofore, conventional glands have afforded a clamp to retain a cable in a connector housing or the like against pullout while also providing a seal against water or air leakage. However, such constructions have generally produced a compression set on the cable resulting in leakage after a relatively short period of time. The present invention resolves this problem by the provision of a construction which separates the sealing and clamping functions and which uses a gland having an unusually effective sealing action, but which still cooperates with an independently acting clamping means such that the sealing action of the gland is maintained at highest efficiency at all times.

Accordingly, it is an object of the present invention to provide a means and method of sealing a cable where it enters an electrical connector or goes through a bulkhead, wherein the sealing action is maintained at a uniformly high efficiency.

Another object of the invention is to provide a device and method as described wherein an effective clamping action on the cable may be produced without affecting the sealing action.

Another object of the invention is to provide a sealing gland which prevents leakage from either side axially thereof.

Another object of the invention is to provide a means and method as described wherein the clamp retains the gland in a desired position, in cooperation with other elements of the connector structure.

Other objects and advantages of the invention will become apparent as the description proceeds in accordance with the drawings in which.

On the drawings:

FIGURE 1 is a side elevational view, partly in vertical section, of a connector according to the present invention;

FIGURE 2 is an end view of the structure shown in FIGURE 1;

FIGURE 3 is a vertical sectional view of the sealing gland of the present invention taken along the line III—III of FIGURE 4; and FIGURE 4 is a vertical sectional view of the sealing gland of the invention taken along the line IV—IV of FIGURE 3.

As shown on the drawings:

Referring now to the drawings, a connector assembly 10 is shown according to the present invention which includes a cylindrical connector housing 12 for receiving a cable 14, a sealing gland 16 and a clamp 18 cooperating with the gland 16 to maintain the cable in sealed, axially fixed relation to the housing 12. The form of connection illustrated and hereinafter further described may also be utilized for sealing a cable where it enters a bulkhead or the like, and for other applications such as sealing solid circular (or non-circular) members entering valve means which must be sealed at pressure differentials.

In the embodiment shown, the sealing element 16 consists of a double circular lip type seal 20 having a circular junction 22 at the midpoint of the axial center line thereof. Thus, the double lips in the physical disposition most clearly shown in FIGURES 1 and 4 resemble the configuration of a "butterfly" having a body portion corresponding to the portion 22 and extending wings corresponding to the parts shown at 24 and 26. The junction 22 has a larger diameter than the diameter of the lip type openings 24 and 26 provided by the seal 20, and consists of an annular ring having two parallel surfaces 28 and 30 which serve to retain the sealing element 16 in the electrical connector housing 12 and to provide the sealing means for the joint formed therewith.

The connector housing 12 may have an annular end flange 32 whose inner diameter may be somewhat larger than the inner diameter of the main body portion thereof, and may have an internal end face formed by an inwardly extending flange 34 with an axially outwardly extending tip 36 to engage the face 28 of the annular ring or junction 22 in sealing relationship. The other face 30 of the annular ring or junction 22 is engaged by means of the clamp 18 and an annular gasket 38, the end flange 32 of the housing 12 being internally grooved at 40 to engage one side of a substantially circumferential spring member 42 at the shoulder portion 44 of the flange 32. As hereinafter set forth, the clamp 18 is provided with clamping plates 46 and 47 for engaging the cable 14 in a predetermined axial position, and an annular ring 48 is recessed externally at its inner end to form a shoulder 50 to engage the other end of the spring member 42. The spring member, in effect, functions as a snap ring to hold the clamp 18 relative to the housing.

The annular ring 22 of the seal 16 is pulled against the internal wall 34, with the outwardly extending tip 36 exerting sealing pressure against the face 28. Preferably, the circumferential top surface 52 of the sealing element or gland 16 has a diameter equal to or slightly greater than the diameter of the internal surface of the flange 32 so as to fit snugly therein as shown.

It will be appreciated that, if desired, the assembly of the invention may afford abutting engagement of the face 30 with a clamping ring threaded to the connector body or any other means to apply a suitable sealing load to the abutting surfaces could be employed without departing from the spirit of this invention.

Molded integrally with ecah face of the annular ring 22 is a conical section which terminates at a circular "doughnut" shaped section. Thus the double circular lip type seal structure 20 includes a conical section 54, continuous with the face 28 and terminating at the "doughnut" shaped section 56 and a conical section 58 continuous with the face 30 and terminating at the "doughnut" shaped section 60. It is these "doughnut" shaped or toroidal sections 56 and 60, which afford the sealing action between the electrical cable 14 and the sealing element 16. The "doughnut" or beaded lip facing the greatest pressure therefore, in effect, becomes the sealing element for the cable. As a result, this pressure cannot blow the opposite sealing lip or "doughnut" open unless the seal for the greater pressure fails. The provision of the relatively thin conical sections 54 and 58 as shown, which extend between the sealing rings 56 and 60 and the outer reference surface or housing shell to be sealed with respect to the cable, thus not only permits the rings to provide a static seal at the rings, but the seal as a whole is given the inherent ability to move dynamically with the cable without loss or sacrifice of sealing pressure. Normally, an O-ring is merely static and has no displacement ability with respect to the elements to be sealed. By connecting the sealing rings 56 and 60 to the housing shell or other reference plane with a membrane of much thinner proportions than the ring, the cable can move with respect to the shell or housing 12 radially (transversely) in any direction or at an angle without the rings being distorted, strained or the seal being broken. In other words, assuming a transverse force on the cable, the membranes or conical sections 54 and 58 will stretch to a much greater extent than the thicker rings 56 and 60. Thereby, elongation through unwanted stretching of the rings is eliminated and sealing pressure is preserved on the side opposite to the direction of the force. Ordinarily, if the transverse force is great enough, a gap would occur between the rings and the cable. This possibility is obviated by the present invention, because the conical shape of the diaphragm and its thinner wall sections will allow the rings to displace transversely as a whole, with the diaphragm webs absorbing the force by stretching.

In order to strengthen the seal portion 20, a plurality of angularly spaced, radially inwardly extending wall sections are formed integrally with the annular ring 16 and the conical sections 54 and 58, such wall sections being generally indicated by reference numeral 62. Twelve such wall sections or bridging elements may be provided, for example, which may extended inwardly for a distance such as to afford flexing of the sealing sections 54 and 58 while maintaining them in a strongly resilient angularly diverging alignment such as to augment the sealing action of the section 54 or 58 at the lip portions 56 and 60 thereof. In the form shown, the wall sections extend axially of the sealing element 16 and inwardly for a distance of approximately half the projected difference between the inner edges or lips 56 and 60 and the inner juncture line 64 of the sections 54 and 58. The bottom edges 66 of the wall sections 62 desirably have a gradually arcuate configuration so as to merge along a continuous line with the inner surfaces of the sections 54 and 58 and to distribute stresses evenly over the said wall sections. When a force occurs such as to move the cable relatively to the housing 12 and in coaxial relation thereto, that is when a straight transverse or radial force occurs, both rings 56 and 60 will function in unison. However, when a transverse force occurs at an angle to the center line of the shell, housing, or gland support, the forces acting on the gland are in opposite directions on each ring.

If such an angular force occurs, one ring will move in one direction while the second ring will move in the opposite direction. In both cases, the action will be equal, but opposite. This dual action may tend to reduce the stress in the ring at the side where the angle between the cable axis is less than 90°; and therefore the radial ribs described stabilize this ring perpendicular to the axis of the cable. This is effected by using the ribs to tie the relaxed portion of one diaphragm to the stressed portion of the other diaphragm immediately adjacent.

A further feature of the invention is that pressure, whether pneumatic or hydraulic, will enhance the seal on the pressure side by tending to collapse it upon the cable. By providing two conical diaphragms, pressure from either direction is utilized to increase the efficiency of the gland without stressing the rings in contact with the cable, and the gland therefore is capable of sealing effectively against pressure variations on opposite sides. This advantage is important in a device exposed to environments which exhibit atmospheric and temperature variations such as cause what is commonly called "breathing" in a connector.

The material for the sealing element 16 may be a resilient elastic such as silicone rubber, and the openings 24 and 26 are smaller than the diameter of the smallest cable that the gland or boot 16 must accommodate. Because of the described resilient and elastic characteristic, however, the gland will accommodate a wide range of cable sizes. Furthermore, this characteristic automatically compensates for cable expansion and contraction without adverse effect on the sealing effectiveness of the gland.

Correspondingly, the gland is suitable for sealing over a relatively wide range of pressure differentials, as for example from 5 to 30 p.s.i., and over a large temperature range, as for example from −70° F. to +475° F.

In installing the gland in a housing such as the connector housing 12, or in other relationships where it is used to seal a cable or the like, the seal or gland 16 is rolled inside out so that, in effect, it is in the form of a large rubber band. It is then moved along the cable, with the face 52 adjacent the cable, until it is located in a desired axial position, and thereupon it is unrolled or reversed to its sealing position.

In one example of a boot constructed according to the present invention, illustrative of the desired proportional relationships of the several parts thereof, the overall diameter of the boot is 1¾ inches, with the diameter of the boot from the bottom edge of the faces 28 and 30, and the inner juncture line 64, being approximately 1 5/16 inches. The diameter of the orifices 24 in the normal condition of the boot is approximately ⅝ inches, and the normal maximum axial dimension of the boot approximately ¾ of an inch. The central diameter between the bottom edge of opposed wall sections 62 is approximately 1 1/32 of an inch, sections 54 and 58 diverging away from one another at an angle approaching 90°.

However, when the boot is inserted on a relatively wide diameter cable, the portions of the sections 54 and 58 beneath the wall sections 62 become relatively flattened and the sections 62 themselves may stretch to exert greater sealing force upon the boot to compensate for the change in force factors on the cable.

In the example specifically shown and described, the gland 16 could accommodate a cable having a diameter of 1.125 inches, as well as a cable of a diameter of .90 inch, with the sealing action being entirely effective in each instance.

In this connection it is again noted that the "doughnut" shaped end sections 56 and 60 have a substantially toroidal shape, with the inner surfaces of the sections extending in a tangent from the interior edges of the said sections 56 and 60. Consequently, as the boot is moved from the normal position shown in FIGURE 4 to an extended position such as is indicated in FIGURE 1, the surfaces of the said sections 56 and 60 are constantly in contact with the cable with no variation in sealing engagement produced by the said flattening action of the gland as it is mounted upon the cable.

Although the beaded edge 56 or 60 exposed to the greater pressure in effect acts as the sealing element for the gland, as stated, it will be appreciated that the gland in effect affords a double sealing action since, in the event that any possible leakage is produced, the second sealing element or "doughnut" shaped section will retain the fluid within the space confined between the diverging sections 54 and 58. Furthermore, the action of the wall sections 62 in drawing the said sections 54 and 58 toward one another will create a downward force between the said sections and the cable to maintain a high degree of compression between the bead and the cable. The very force of the fluid itself will cause the external section wall to be pressed downwardly, as a result of the inclination of the said sections, and will thus increase the sealing action to the extent that the pressure is increased. Consequently, the gland affords an automatic compensating action for pressure increases.

In order to assure that the sealing action afforded by the gland 16 is not reduced by compressive clamping forces, as with previously available sealing means, the clamp 18 is constructed to effect clamping action on the cable 14 in axially displaced relationship to the gland 16 while cooperating with the gland in maintaining the joint between the gland and the housing 12 as hereinabove described. To this end, the clamp 18 includes a pair of axially aligned oppositely disposed lugs 66a and 68 which extend outwardly from the ring 48 and are integrally formed therewith so as to provide shoulders 70 and 72 opposite the shoulder 44 on the annular flange 32. The lugs 66a and 68 form outer end bosses 74 and 76 which have transversely extending threaded apertures 78 and 80 for the purpose of releasably securing the clamping plates 46 and 47 in clamping engagement with the cable 14. Thus each of the clamping plates 46 and 47 defines coplanar end flanges 82 and 84, as seen with respect to the plate 46, which define threaded and smooth-bored apertures 85 and 87 respectively, so that bolts 86 and 88 may be passed through the apertures 78 and 80 in register therewith to connect the plates 46 and 47 as shown in FIGURE 2, with the bolts preferably extending in opposite directions. Thus forces on the clamping plates will tend to be equalized by the opposed alignment of the bolts 86 and 88. The bolts 86 and 88 may also be provided with kerfed heads for adjustable tightening of the clamping action afforded by the plates 46 and 47.

The plates 46 and 47 are formed with inner surfaces having radii such as to accommodate cables of different sizes corresponding to the sizes adapted to be received by the gland 16. In one example of a specific plate construction, each of the plates has an arcuate central portion as indicated by reference numerals 90 and 92 formed around a radius of .323 inch for clamping engagement with the cable 14. However, each of the portions 90 and 92 is formed with a longitudinally and transversely curved reinforcing boss to strengthen the action of the clamps in engaging the said cable, as indicated by reference numerals 94 and 96. In the example shown, these bosses may have a radius of .300 inch for the longitudinal arc and a transverse radius of $\frac{5}{64}$ of an inch. It will of course, be understood that variations in the particular dimensions of the elements herein set forth may be made within the scope of the invention, these dimensions being indicated for purposes of illustration only.

However, it will also be appreciated that when the clamping plates 46 and 47 are secured into engagement with the cable 14 as shown in FIGURES 1 and 2, the ring 48 provides a stable base for coacting resilient engagement of the sealing element 16 and connection with the cylindrical housing 12.

In order to accommodate the previously described spring 42, the ring 48 has a preferably gradually chamfered recess 98, the inclination thereof being approximately 15° in one form of the invention. Thus there will be no interference with the engagement of the spring element 42 between the shoulders 44 and 50 on the housing 12 and the clamp 18 respectively. Desirably, the ring 48 has an outer end shoulder 100 adapted to be disposed in register with the end flange or ring 32, as shown in FIGURE 1, and having an axially inwardly extending boss 102 receivable in a recess 104 in the said ring 32. Thereby, any tendency toward relative rotation between the clamp 18 and cable 14 and the housing 12 is obviated. The recess 104 also extends to expose the spring 42, and it will thus be seen that this spring may be readily engaged to lift it from engagement with the shoulder 50 and release the compressive forces created by deliberate discrete displacement of the flange or ring 22 of the butterfly seal. Consequently, disassembly of the sealing assembly of the invention may be easily accomplished, with no special skills or techniques being required, and assembly thereof may be similarly effected in a simple manner, by placing the spring 42 between the shoulders 44 and 50, in the position shown in FIGURE 1, and clamping the plates 46 and 47 in an axial location such as to produce a desired pressure engagement with the sealing element 16. As hereinabove indicated, the sealing element 16 itself is readily positioned in the desired axial position on the cable 14, and relative to the housing structure 12, by turning it inside out so that the butterfly sealing means 20 is disposed outwardly and moving it axially along the cable until the said position is reached, whereupon it is returned to its normal condition for engagement with the cable.

The opposite end of the housing 12 may also have a configuration providing a recess 106 for engagement of a spring therein substantially in the manner described with respect to the spring 42, as well as a locking lug 108 for engagement within a surrounding annular flange corresponding to the flange 32. Thus a plurality of axially continuous connections may be afforded similar to that herein described.

Accordingly, a highly effective and simple sealing assembly has been provided which separates the functions of sealing and clamping so that no loss in sealing or clamping action is produced, while affording a cooperative relationship between the clamp and the seal structure such as to maintain the sealing element in a desired presture engagement with the housing structure.

The device is composed of relatively few parts, with the clamping structure thereof being positioned in a secure but readily accessible location relative to the housing for assembly and disassembly, and maintaining the assembly against relative rotation between the respective parts. The device is suitable for use in a wide variety of applications, in addition to those herein set forth, and may be utilized wherever an effective doubly reinforced seal is needed for cylindrical or non-cylindrical lengths of material. And although the structure has been described with respect to relatively low pressure situations, the unique sealing action afforded by the inclined relation of the sections 54 and 58 of the gland relative to the cable permits an increased sealing action to be produced as the pressure increases so that it is also suitable for sealing against relatively higher pressures.

Although I have herein set forth and described my invention with respect to certain specific principles and details thereof, it will be understood by those skilled in the art that these may be varied without departing from the spirit and scope of the invention as set forth in the hereunto appended claims.

We claim:

1. A sealing gland for an electrical connector comprising,
   an electrical connector housing having
      an annular ring in the interior thereof,
         said annular ring having an opening therein through which a current-continuing member extends,
      and a pair of flexible sealing membranes extending radially inwardly and mutually diverging from said annular ring into said opening in a conical configuration,
         each of said membranes having an inner end disposed for conforming engagement with the current-continuing member,
      and an annular bead on each inner end of greater diameter than the cross-sectional thickness of the membrane,
         said beads being radially spaced from said annular ring and forming axially aligned openings for conformably and sealingly engaging the current-continuing member, said membranes being yieldable without stressing the beads in conforming contact with the current-continuing member,
      and a plurality of radially aligned, circumferentially spaced, resiliently stretchable walls axially joining said membranes and said annular ring, said stretchable walls terminating inwardly in radially spaced relationship to said beads,
   thereby to stabilize the gland perpendicular to the axis of the current-continuing member.

2. An electrical connector having a housing for a current-continuing means such as a cable or the like, an outer annular resilient ring for sealing engagement with said housing, and a pair of relatively thin, flexible diaphragms extending inwardly from said annular resilient ring and diverging from one another, said diaphragms together having a cross-sectional conical configuration, and a sealing ring at the inner end of each of said diaphragms having a diameter greater than the thickness of said diaphragms, said sealing rings forming axially aligned openings and being effective to conformably engage and seal the current-continuing means extended therethrough, said diaphragms accommodating transverse forces on the sealing rings to permit transverse movement of the sealing rings without stretching thereof and said diaphragms being effective to transmit external pressure forces thereon to said sealing rings to assist the conforming contact and sealing action of said sealing rings, and a plurality of circumferentially spaced axial ribs interconnecting the diaphragms, said ribs being spaced radially from said sealing rings and stabilizing the rings so that oppositely directed forces on the rings will not effect a loss of sealing action.

References Cited in the file of this patent

UNITED STATES PATENTS

| | | |
|---|---|---|
| 32,464 | Bunnell | June 4, 1861 |
| 255,523 | Lightburne | Mar. 28, 1882 |
| 1,173,825 | McNallen | Feb. 29, 1916 |
| 1,287,285 | Gammeter | Dec. 10, 1918 |
| 1,701,326 | Johnson | Feb. 5, 1929 |
| 1,802,177 | Knight | Apr. 21, 1931 |
| 1,851,404 | Rose | Mar. 29, 1932 |
| 2,041,132 | Johnson | May 19, 1936 |
| 2,260,712 | Harrison | July 30, 1938 |
| 2,551,393 | Pinger | May 1, 1951 |
| 2,815,973 | Jackson | Dec. 10, 1957 |
| 2,840,395 | Tarnow | June 24, 1958 |
| 2,890,434 | Ray | June 9, 1959 |
| 2,914,845 | Crites | Dec. 1, 1959 |
| 2,924,007 | Wrightfield | Feb. 9, 1960 |
| 2,962,314 | Rickard | Nov. 29, 1960 |
| 3,028,165 | Collins | Apr. 3, 1962 |

FOREIGN PATENTS

| | | |
|---|---|---|
| 40,031 | Germany | July 21, 1887 |
| 129,944 | Australia | Nov. 10, 1948 |